Oct. 21, 1969
R. P. RICKEY
3,474,296
LOW VOLTAGE CUT-OUT DEVICE
Filed April 5, 1967
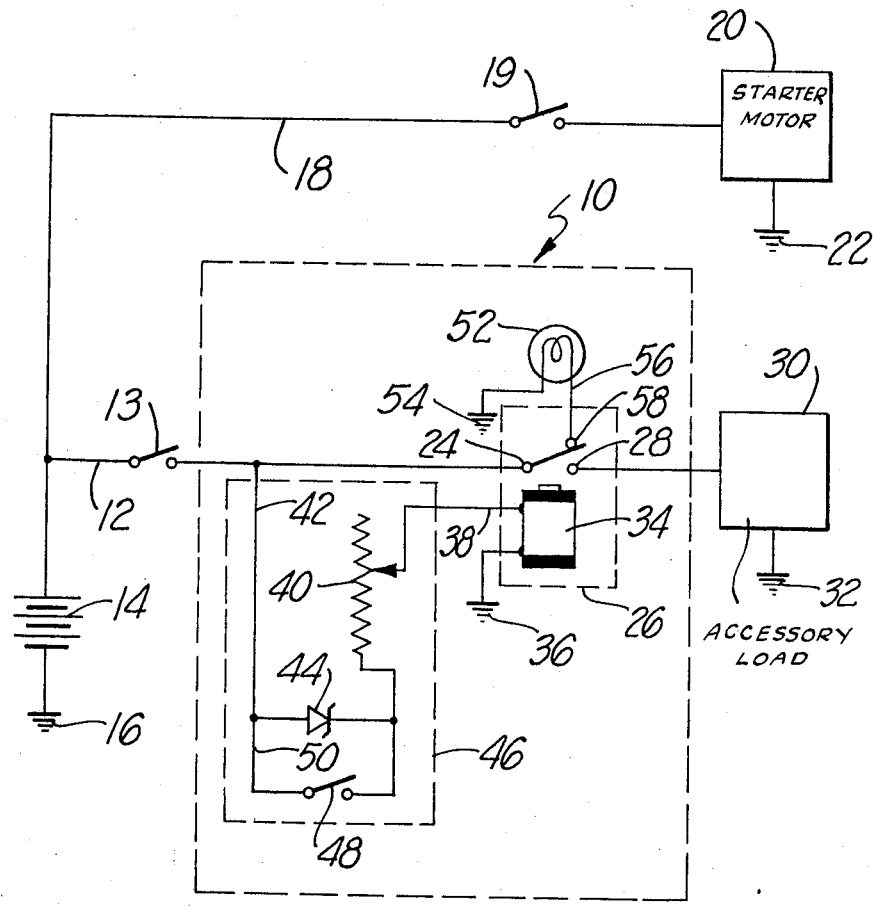
INVENTOR
RONALD P. RICKEY
BY
EDWARD D. O'BRIAN
ATTORNEY United States Patent Office 3,474,296
Patented Oct. 21, 1969

3,474,296
LOW VOLTAGE CUT-OUT DEVICE
Ronald P. Rickey, Orange, Calif., assignor to Eltop Corp., Anaheim, Calif., a corporation of California
Filed Apr. 5, 1967, Ser. No. 628,696
Int. Cl. H02h 3/28
U.S. Cl. 317—31                    12 Claims

ABSTRACT OF THE DISCLOSURE

A device is disclosed for disconnecting a battery from a secondary load when the battery voltage drops below a predetermined level so that the battery retains enough power to operate a primary load. The preferred embodiment has a relay which has normally open contacts in the secondary load circuit and a voltage-sensitive means connected to the relay coil and to the secondary load circuit. The voltage-sensitive means is operative to energize the coil so as to close the relay contacts only when the voltage supplied by the battery is above a predetermined level.

Background

It is common for a battery to be used to supply power for both a primary purpose and a secondary purpose. In these circumstances, if the battery power is seriously drained for the secondary purpose, it is impossible for the battery to adequately supply power for the primary purpose. This frequently leads to difficulty and/or inconvenience which could have been avoided by restricting the use of the battery for the secondary purpose.

A number of examples of this type of thing are commonly encountered. As one example, a conventional automotive car battery serves a primary function in starting the car. The appropriate standard ignition and electric motor starter mechanism within a car may be classified as a primary load for such a battery. Such a battery in an automotive vehicle is also frequently used for a number of secondary purposes such as operating a conventional radio, a radio transmitter, lights, and various other accessories. When the automotive engine is not operating so as to supply current through the usual generator or alternator, and power is supplied to such secondary loads, there is a significant danger of the battery being drained to a point that it will no longer be operative to start the car. A similar situation prevails even when a car is running if the current consumption of the secondary load or loads exceeds the current production from the car generator or alternator.

Related problems of essentially a similar character are encountered with different types of vehicles such as motorcycles, travel trailers, campers and the like. In all of these applications it is desirable and/or necessary to conserve sufficient power within a battery so that the battery will always be capable of serving its primary function in supplying power to a primary load. If a battery is drained to a point where it is incapable of doing this, there is significant danger of a vehicle being literally stranded so that it cannot be operated. Thus, for example, a trailer or camper owner may find himself in a situation where the car pulling the trailer or the truck holding the camper will not start because of battery drain in supplying secondary loads such as lights, pumps, or the like.

Summary of the invention

This invention is primarily directed to alleviating problems resulting from a battery being unable to supply the requisite current for a primary load because of its use in supplying current to one or more secondary loads. Various objects of this invention are to provide devices for this generalized type of purpose which are relatively simple to construct, which are inexpensive, which are easy to use and which are extremely effective in accomplishing their intended purpose. These and various other objects of the invention will be more fully apparent from a detailed consideration of this specification, the appended claims and the accompanying drawings.

By way of summary, it can be indicated that the invention concerns the use of a device for breaking a circuit used to supply electric current to a load from a battery should the voltage of the current fall below a predetermined level, this device including a relay means having normally open contacts in the circuit and a coil for closing these contacts, a voltage-sensitive means connected in the circuit between the battery and the contacts, the voltage-sensitive means being connected to the coil and being operative to pass a current of at least this predetermined voltage level to the coil so as to cause the contacts to close, but being incapable or substantially incapable of passing a lesser voltage so that when the battery delivers such a lesser voltage the relay contacts are open and no power is supplied to the load.

While it is primarily intended that a device as described in the preceding brief summary be used to disconnect a secondary load from a battery so that the battery is always operative or retains enough power to operate a primary load, it will be recognized that a device as described can be used so as to directly disconnect a primary load so as to avoid undue current drain on the battery. In any of these applications, the device of this invention is intended to be used with a battery which, as it is drained delivers a current having a decreasing voltage. It is considered that most common batteries in use, such as conventional lead acid automotive batteries are of this category.

Description of the drawing

In the drawing, there is shown an electrical schematic view of a presently preferred embodiment of a device of this invention. From this schematic presentation those skilled in the art of the construction of electrical devices will realize that a device of this invention can be constructed in a number of different manners.

Description of the preferred embodiment

In the drawing there is shown a presently preferred embodiment of a device 10 of the present invention which is connected by a line 12 to a conventional battery 14 such as a common lead-acid automotive battery. A cut-off switch 13 may be in the line 12. One terminal of this battery 14 is grounded by a ground 16. The battery 14 is also connected by another line 18 to a primary load 20 such as the starter and ignition system of an automotive vehicle. A conventional switch 19 is in this line 18. This load 20 is grounded by a ground 22 in a conventional manner.

In the device 10 the line 12 extends into the device where it is connected to one terminal or contact 24 of a conventional relay 26 having another contact 28 in the line 12. This line 12 leads through the device 10 to a secondary load 30 such as a radio-telephone transmitter, lights, a radio or the like. This load 30 is grounded by a conventional ground 32. The contacts 24 and 28 in the relay 26 are normally open. They are adapted to be closed when current is supplied to a relay coil 34 in an established manner. One end of this coil 34 is grounded by a conventional ground 36; the other end is connected by a line 38 to a conventional variable resistor 40 which is connected in series in a line 42 with a Zener or breakdown diode 44. The line is connected to the line 12 between the relay 26 and the battery 14 so that the battery 14 is always operative to supply current to the diode 44.

With this construction the load 20 may or may not be operated at any time so as to draw current from the battery 14. However, when the switch 13 is closed this battery 14 always supplies current to the diode 44. When the current supplied to the diode 44 has a sufficient voltage, this diode 44 passes current to the relay coil 34, actuating this coil so as to close the relay contacts 24 and 28. This, of course, connects the secondary load 30 to the battery 14 so that this secondary load can be and/or is operated.

However, when, because of battery drain, the voltage of the current supplied by the battery 14 drops below the break-down voltage of the diode 44, this diode 44 does not pass any significant current. Hence, when this happens the coil 34 is inoperative to close or to maintain closed the contacts 24 and 28, and the secondary load 30 is disconnected from the circuit. This serves to prevent the battery 14 from being drained to the point that it will no longer operate the primary load 20 because the diode 44 does not pass a current having a voltage which is sufficiently high to enable the battery 14 to operate the primary load 20.

From this description, it can be seen that the circuit 46 within the device 10, including the diode 44 and the variable resistor 40 may be referred to as a voltage-sensitive means for permitting current having at least a predetermined voltage to flow in the device 10 so as to operate the relay 26. In this structure, the variable resistor 40 is not always required, and may be omitted or replaced by a fixed resistor if the electrical values of the diode 44 and the relay coil 34 are appropriately chosen. Because of manufacturing tolerances, it is considered preferable to use a variable resistor such as the resistor 40 in order to compensate for any lack of balance within the circuit of the device 10.

Because of various factors, it is frequently desired to obtain temporary or intermittent operation of the load 30 after the device 10 has cut off the power supply to this load from the battery 14. Thus, for example, a person using a radio-telephone may wish to conclude a conversation, a travel trailer owner may wish to operate lights for a few moments in order to complete arrangements for a night or the like after the device 10 has operated in the intended manner. Normally, such use in minor and does not drain a battery such as battery 14 to a point where it is incapable of operating a primary load such as primary load 20. In order to permit such temporary use, the device 10 may contain a conventional switch 48 connected in a line 50 in parallel with the diode 44. When the switch 48 is closed, it by-passes this diode 44, supplying current directly to the coil 34, permitting the relay contacts 24 and 28 to close. Preferably the switch 48 is of a type which has to be held in a closed position in order to complete a circuit in order to prevent undue battery drainage.

The device 10 also preferably includes an indicator means 52, serving to indicate when this device 10 has been operative for its intended purpose so as to open the circuit to the load 30. In the device 10 the indicator means 52 is a conventional light bulb of low current consumption. This bulb 52 is grounded with a conventional ground 54 and is connected by a lead 56 to a relay contact 58. The relay 26 is of such a character that when the contact 24 is open with respect to the contact 28, it is electrically connected to the contact 58. With this structure the light 52 visually indicates when power is not being supplied to the load 30.

As a further aid to understanding this invention, it is indicated that a successful device 10 of this invention for use with a conventional 12-volt automative lead-acid battery has been constructed using as the diode 44 a 5.6–7.0-volt commercial Zener diode; as the variable resistor 40 a 100 ohm variable resistor; and as the relay 26 a realy having 5 volt closing, 2.5 volt open characteristic. With this construction, when 12–13.5 volts are supplied by the battery 14 through the diode 44 this relay is operative so as to supply current to the load 30. When the voltage at the relay 26 drops to 11–11.5 volts, the relay 26 allows the contacts 24 and 28 to open, disconnecting the load 30.

It will be realized that the foregoing values are given solely to facilitate an understanding of this invention. Obviously different electrical components having different electrical values can be used in making devices such as the device 10. Similarly, various other changes may be made in the device 10 through the use of routine electronic design skill without departing from the essential character of this invention.

I claim:
1. In an electric circuit, said circuit including a line connecting a source of electric current to a load, a device for breaking the circuit should the voltage of said current fall below a predetermined level, which comprises:
   relay means having normal open contacts and a coil which, when energized, causes said contacts to close;
   said contacts being connected in said line so that when current is supplied to said coil, said contacts are closed; and
   voltage-sensitive means capable of passing a current having at least a predetermined voltage, said voltage-sensitive means being connected to said line between said source of electric current and said contacts, said voltage-sensitive means also being connected to said coil so as to be capable of supplying a current to said coil, said voltage sensitive means being for the purpose of supplying a current to said coil when the voltage of said current from said source is at least at said predetermined voltage;
   manually controlled switch means for connecting said source of electric current in series circuit relation with said load and in series circuit relation with the voltage-sensitive means and the coil of the relay;
   said voltage-sensitive means serving to supply a current to said coil when the voltage of said current is at least at said predetermined level and being substantially incapable of passing current to said coil when said current is of a lesser voltage.

2. In an electric circuit a device as claimed in claim 1 including:
   indicator means connected to said relay means for indicating when said normally open contacts of said relay means are open.

3. In an electric circuit a device as claimed in claim 1 including:
   a by-pass switch connected around said voltage-sensitive means, said by-pass switch being normally open and being capable of being closed so as to supply a current to said coil when said voltage-sensitive means does not supply a current to said coil.

4. In an electric circuit a device as claimed in claim 1 wherein:
   said voltage sensitive means comprises a Zener diode connected between said line and one terminal of said coil so as to be capable of passing a current from said line to said coil.

5. In an electric circuit a device as claimed in claim 4 including:
   indicator means connected to said relay means for indicating when said normally open contacts of said relay means are open.

6. In an electric circuit a device as claimed in claim 4 including:
   a by-pass switch connected around said voltage sensitive means, said by-pass switch being normally open and being capable of being closed so as to supply a current to said coil when said voltage sensitive means does not supply a current to said coil.

7. In an electric circuit a device as claimed in claim 1 wherein:
   said voltage sensitive means comprises a Zener diode and a potentiometer connected in series between said line and one end of said coil.

8. In an electric circuit a device as claimed in claim 7 including:
   indicator means connected to said relay means for indicating when said normally open contacts of said relay means are open.

9. In an electric circuit a device as claimed in claim 7 including:
   a by-pass switch connected around said voltage-sensitive means, said by-pass switch being normally open and being capable of being closed so as to supply a current to said coil when said voltage sensitive means does not supply a current to said coil.

10. In an electric circuit a device as claimed in claim 1 including:
    indicator means connected to said relay means for indicating when said normally open contacts of said relay means are open; and
    a by-pass switch connected around said voltage-sensitive means, said by-pass switch being normally open and being capable of being closed so as to supply a current to said coil when said voltage sensitive means does not supply a current to said coil.

11. An electrical system, comprising in combination:
    (A) a primary load including:
        (1) a motor for cranking an engine;
    (B) a secondary load;
    (C) a storage battery of the type having a limited source of energy;
    (D) a circuit including the battery, the secondary load and further including:
        (1) a relay actuated switch;
    (E) a second circuit including:
        (1) a relay coil for closing the relay actuated switch,
        (2) a voltage-sensitive means capable of passing current to the relay coil for maintaining the coil effective to retain the relay actuated switch closed for as long as the voltage of the storage battery has a value sufficient for cranking the engine by the said motor, said voltage-sensitive means being incapable of passing sufficient current to said relay coil to retain the relay contacts closed when the voltage of the battery is less than the aforesaid value;
    (F) a third circuit independent of the first and second mentioned circuits and including the battery, said motor and further including:
        (1) a manually controlled switch for connecting and disconnecting the motor and battery.

12. An electrical system as defined in claim 11, characterized to include:
    (G) manually actuated switch means for rendering the first and second mentioned circuits operative and inoperative.

References Cited

UNITED STATES PATENTS

| | | | |
|---|---|---|---|
| 3,243,658 | 3/1966 | Blackburn | 317—31 |
| 3,395,288 | 7/1968 | Von Brimer | 320—40 X |

OTHER REFERENCES

Silicon Zener Diode and Rectifier Handbook, Second Edition, July 10, 1961, Motorola, Inc., p. 79.

LEE T. HIX, Primary Examiner

J. D. TRAMMELL, Assistant Examiner

U.S. Cl. X.R.

307—10; 315—77; 317—52; 320—40